United States Patent [19]

Clendinen

[11] Patent Number: 4,996,752
[45] Date of Patent: Mar. 5, 1991

[54] STUD AND EYELET FASTENER

[76] Inventor: Charles D. Clendinen, 152 Lodewyck, Mt. Clemens, Mich. 48043

[21] Appl. No.: 340,203

[22] Filed: Jan. 18, 1982

Related U.S. Application Data

[63] Continuation-in-part of Ser. No. 255,370, Apr. 20, 1981, abandoned.

[51] Int. Cl.$^5$ ............................................. A41F 1/08
[52] U.S. Cl. ........................................ 24/464; 24/586
[58] Field of Search ............... 24/208, 208 A, 213 R, 24/361, 201 R, 201 A, 202, 206 B, 208 R, 211 R, 219, 217 R, 141, 143, 580, 618, 662, 588, 589, 590, 464, 586; 292/DIG. 38

[56] References Cited

U.S. PATENT DOCUMENTS

| Re. 14,581 | 12/1918 | McKeekin | 24/580 |
| 59,718 | 11/1866 | Holland | 24/659 |
| 103,985 | 6/1870 | Comstock et al. | 24/591 |
| 120,493 | 10/1871 | Clark | 160/390 |
| D. 228,624 | 10/1973 | Imershein et al. | D8/367 |
| 484,335 | 10/1892 | Moss | 248/317 |
| 485,008 | 10/1892 | House | 248/125 |
| 506,110 | 10/1893 | Hampel | 24/202 |
| 758,015 | 4/1904 | Miller | 248/125 |
| 868,082 | 10/1907 | Freschl | 24/649 |
| 966,544 | 8/1910 | Heaton | 24/658 |
| 973,809 | 10/1910 | Pitner | 24/590 |
| 981,639 | 1/1911 | Hall | 150/48 |
| 1,007,322 | 10/1911 | Barnes | 248/188.5 |
| 1,091,849 | 3/1914 | King | 160/382 |
| 1,187,648 | 6/1916 | Perry | 296/100 |
| 1,204,173 | 11/1916 | McMeekin | 24/580 |
| 1,452,150 | 4/1923 | Foster et al. | 24/649 |
| 1,546,936 | 7/1925 | McCarthy | 24/573 |
| 1,550,916 | 8/1925 | Miller et al. | 24/572 |
| 1,845,143 | 2/1932 | Friesner | 403/109 |
| 1,907,495 | 5/1933 | Brunski | 411/397 |
| 1,925,053 | 8/1933 | Massino | 248/110 |
| 1,971,340 | 8/1934 | Foulk | 273/361 |
| 2,148,401 | 2/1939 | Ellis, Jr. | 160/DIG. 6 |
| 2,310,249 | 2/1943 | Maskey | 16/2 |
| 2,320,308 | 5/1943 | Silverman | 40/622 |
| 2,331,600 | 10/1943 | Dillow | 160/368 S |
| 2,348,390 | 5/1944 | Kass | 411/533 |
| 2,422,891 | 6/1947 | Dickson | 248/110 |
| 2,483,789 | 10/1949 | Smith et al. | 150/51 |
| 2,544,074 | 3/1951 | Ernst et al. | 150/49 |
| 2,544,399 | 3/1951 | Schneider | 24/574 |
| 2,671,355 | 3/1954 | Hawkins | 188/67 |
| 2,895,199 | 7/1959 | Jones | 24/213 R |
| 2,937,652 | 5/1960 | Zimmer, Jr. et al. | 135/119 |
| 2,941,270 | 6/1960 | Long | 24/217 |
| 2,944,601 | 7/1960 | Compson | 160/368 S |
| 2,980,975 | 4/1961 | Jones | 24/217 |
| 3,109,619 | 11/1963 | Krug et al. | 248/110 |
| 3,123,331 | 3/1964 | Field et al. | 248/317 |
| 3,161,929 | 12/1964 | Swett | 248/317 |
| 3,199,818 | 8/1965 | Ahara | 403/109 |

(List continued on next page.)

OTHER PUBLICATIONS

Forbes Brothers Co. brochure (1 page) Feb. 24, 1959.
E. Uberbacher, "Strain Relief Device", Jan. 1962, (1 page technical disclosure).

Primary Examiner—Kenneth J. Dorner
Assistant Examiner—J. Hakomaki
Attorney, Agent, or Firm—Brooks & Kushman

FOREIGN PATENT DOCUMENTS

| 91282 | 5/1921 | Austria | 24/213 |
| 176293 | 4/1917 | Canada | 135/119 |
| 98040 | 6/1898 | Fed. Rep. of Germany | 24/217 |
| 2254352 | 5/1974 | Fed. Rep. of Germany | 24/453 |
| 2833492 | 2/1980 | Fed. Rep. of Germany | 24/647 |
| 432937 | 12/1911 | France | 24/590 |
| 621803 | 5/1927 | France | 24/591 |
| 872204 | 6/1942 | France | 24/618 |
| 203786 | 9/1923 | United Kingdom | 24/457 |
| 453684 | 9/1936 | United Kingdom | 248/354.3 |
| 613038 | 11/1948 | United Kingdom | 248/317 |

[57] ABSTRACT

A stud and eyelet fastener is positively locked together by pivoting the eyelet on the stud in an eyelet pivot seat to an askew position requiring the eyelet to snap past a latching shoulder, and wherein the stud and/or eyelet deforms within the elastic limit as the eyelet passes the latching shoulder.

24 Claims, 3 Drawing Sheets

U.S. PATENT DOCUMENTS

| | | | |
|---|---|---|---|
| 3,238,586 | 3/1966 | Stoffel | 403/408 |
| 3,328,854 | 7/1967 | Tombari | 24/141 |
| 3,381,806 | 5/1968 | McDonagh | 150/52 R |
| 3,395,692 | 8/1968 | Johns | 248/125 |
| 3,421,670 | 1/1969 | Hansson | 224/161 |
| 3,454,021 | 7/1969 | Morris | 135/119 |
| 3,480,069 | 11/1969 | Handwerker | 160/354 |
| 3,575,373 | 4/1971 | Reinhardt | 248/509 |
| 3,727,972 | 4/1973 | Belk | 135/115 |
| 3,734,441 | 5/1973 | Lux | 403/109 |
| 3,774,824 | 11/1973 | Hansson et al. | 224/161 |
| 3,856,191 | 12/1974 | Pohl | 224/153 |
| 3,986,746 | 10/1976 | Chartier | 24/564 |
| 4,044,813 | 8/1977 | Emmons | 160/354 |
| 4,140,163 | 2/1979 | Usner | 383/22 |
| 4,141,452 | 2/1979 | Martin et al. | 248/309.1 |
| 4,248,367 | 2/1981 | Buel | 224/155 |
| 4,305,171 | 12/1981 | Pettersson | 24/217 R |
| 4,315,651 | 2/1982 | Endicott, Jr. et al. | 24/590 |
| 4,392,283 | 7/1983 | Timmons | 248/317 |

U.S. Patent     Mar. 5, 1991     Sheet 1 of 3     4,996,752
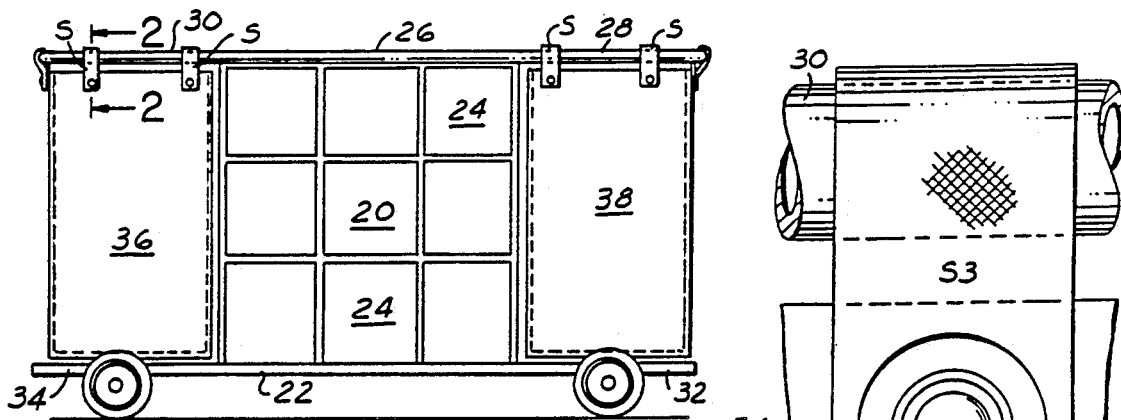
FIG.1
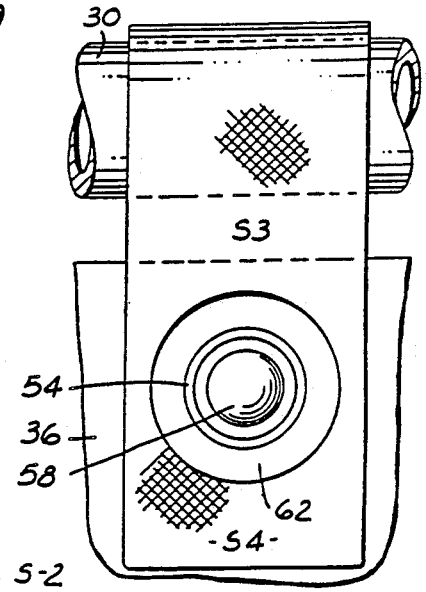
FIG.3
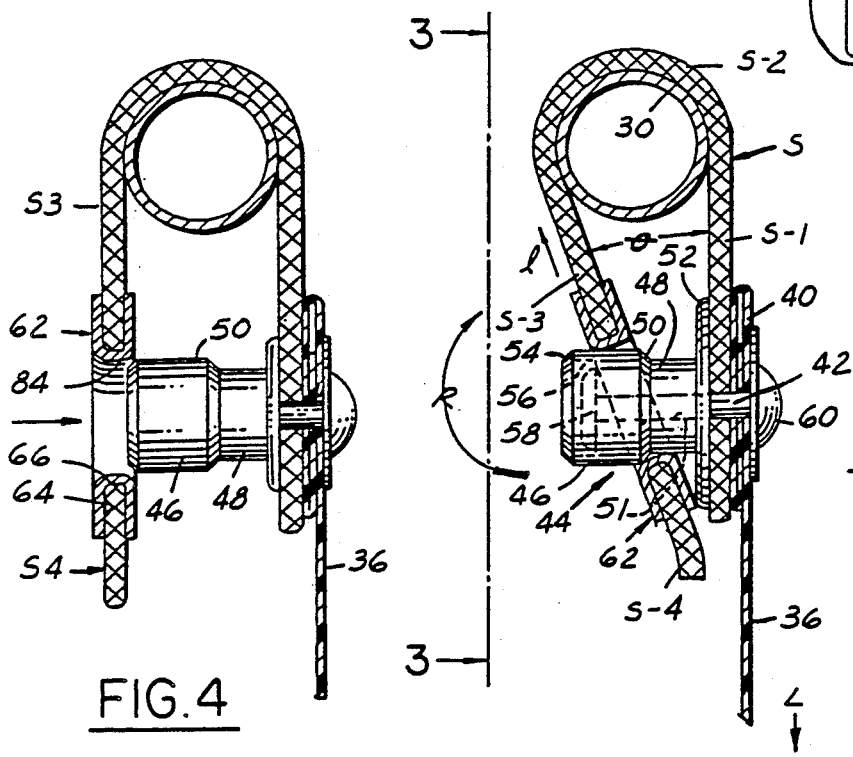
FIG.2
FIG.4
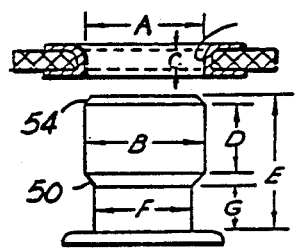
FIG.5
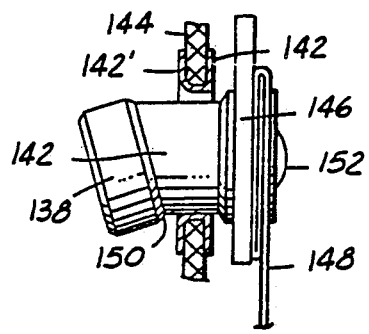
FIG.6

STUD AND EYELET FASTENER

RELATED APPLICATION

This is a continuation-in-part of my earlier filed application, Ser. No. 255,370, filed 20 Apr. 1981 now abandoned.

FIELD OF INVENTION

This invention relates to stud and eyelet fasteners of the snap fastener type intended to temporarily connect together members with which the stud and eyelet are respectively associated.

BACKGROUND OF THE INVENTION

There has been a long-felt need for a fastener which overcomes some of the problems associated with the snap button fastener, such as the DOT®fastener found in service on boat covers and many other canvas and the like articles. Some of the problems associated with the conventional DOT®type fastener are:

(a) There is a critical tolerance requirement that makes snap buttons unpredictable as to holding strength. Since snap buttons operate by the critical mating of two dimensions, they are subject to great variation in holding strength because of variations in dimensions or tolerances in the spring ring and male stud parts. Because most snap button fasteners are sheet brass made on progressive dies, they are soft enough to be deformed during usage and this can render them inoperable or change their holding characteristics, making them either too loose or too tight.

(b) Weathering of the parts of snap button fasteners can make the buttons too tight to pull apart, especially in hostile environments like salt water, industrial pollution and the like.

(c) Limited strength due to manufacture from sheet brass or molded plastic construction renders the conventional snap button fastener of limited utility when confronting heavy loads.

(d) There is considerable difficulty in operating such a fastener when either the male or female side of the fastener is covered with foreign matter such as dust, mud, ice, grease, etc.

In the prior art the following patents depict fastening devices in which a stud and/or eyelet must be deformed as a necessary condition precedent to latching or locking the stud and eyelet together: U.S. Pat. Nos. 991,156; 2,397,801; 2,986,790; 3,213,507; 3,349,451; 3,416,200; 3,729,780 and 3,786,982.

SUMMARY OF THE INVENTION

I have discovered that a stud and eyelet fastener may be provided in which there are no moving parts except the stud member and the eyelet member, and these elements are not deformed or deflected as a condition precedent to affecting a latching or locking therebetween. In addition, my stud and eyelet fastener retains the desirable feature of the prior art snap button fasteners of providing a single point attachment with one rivet, screw, bolt, etc. In addition, my improved fastener may be made in sizes from very small to very large to accommodate varying applications. It may be formed of a variety of materials to accommodate the various requirements of the environment in which it may be used. In addition, the fastener may be applied to either rigid or flexible materials and may effect either a temporary or a permanent securement thereof, though the fastener is essentially intended for temporary connection which may be readily disconnected as desired.

In carrying out the invention, I provide a stud which is intended to project in upstanding relation from one of the two parts to be fastened together and which has a latching shoulder spaced from but facing such part. There is an eyelet which is intended to be associated with the other part to be connected. The eyelet is adapted to be telescopically slipped over the stud. When on the stud beneath the shoulder the eyelet may be shifted relative to the stud into a skewed position wherein one side of the eyelet is caught beneath the shoulder and the opposite side rides the stud above the shoulder. In such skewed position the stud and eyelet are locked together against separation and will remain in such locked condition until they are sufficiently realigned so that the eyelet may be again withdrawn from its latched position beneath the shoulder.

The stud and eyelet may be held in the aforesaid skewed and latched relation by one or both of the parts themselves with which the stud and eyelet are associated. For example, where the fastener is used to connect the ends of a flexible strap looped around a support or the like, the resultant angle of departure between the strap portions will tend to hold the stud and eyelet in skewed position such that any strain imposed on the strap will simply force the stud and eyelet into even more tightly latched relation.

In several embodiments of the invention, means are provided for resiliently holding the stud and eyelet in the aforesaid skewed relation. Such means comprise an elastomeric button or abutment and may cause the stud and eyelet to emit a positive snapping noise when they are latched together.

Other features and advantages will become apparent during the following description.

BRIEF DESCRIPTION OF THE DRAWINGS

FIG. 1 is a side elevation of a linen service cart employing the stud and eyelet fasteners of my invention;

FIG. 2 is a cross-sectional view of a fastener taken at the line 2—2 of FIG. 1;

FIG. 3 is an elevational view taken at 3—3 of FIG. 2;

FIG. 4 is similar to FIG. 2 but before the stud and eyelet are assembled together;

FIG. 5 illustrates relative dimensions of the stud and eyelet members;

FIG. 6 is a side elevation of a modification of the stud and eyelet fastener;

DETAILED DESCRIPTION OF PREFERRED EMBODIMENTS

Figure 7:
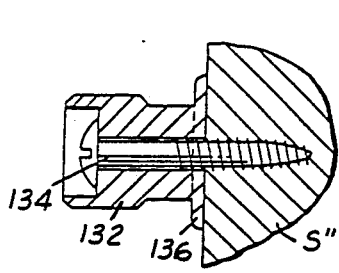
FIG. 7 is a cross-sectional view through a stud intended to be mounted on a rigid support.

Fasteners of my invention may have a variety of applications, one of which is shown in connection with a linen service cart 20 in FIG. 1. The cart may comprise a wheeled base 22 having linen storage compartments 24 in a central portion of the cart. A tubular frame 26 is affixed to the upper edge of the compartment portion and has closed curved extremities 28 and 30 which overhang correspondingly projecting ends 32 and 34 of the base such that linen bags 36 and 38 may be suspended from the frame end portions 28 and 30 above the base. Heretofore conventional snap type fasteners have been used to suspend the bags and considerable difficulty has been encountered when the fasteners tend to jam and the housekeepers have experienced difficulty in releasing the bags from their suspended condition on the frame, or the fasteners become so loose that they voluntarily unsnap from the weight of the bags.

The bags 36 and 38 are, according to my invention, suspended from the frame by straps S. Referring to FIGS. 2–4, the upper margin of the bag is folded upon itself to form a reinforced edge 40. The strap S is affixed to the reinforced margin by a rivet 42 and stud 44. The stud is generally cylindrical and includes a head portion 46 having a cylindrical eyelet bearing surface, a reduced diameter shank portion 48 for supporting the head in spaced relation from the strap or bag, and a circumferential latching shoulder 50 extending between the head and shank and facing the bag margin and overhanging the shank 48. A rivet receiving hole 51 extends through the stud from one end to the other.

As shown in FIGS. 2 and 4, the strap S includes an end portion S-1 which is gripped between an optional base flange 52 of the stud and the marginal edge 40 of the bag. The flange 52 may be a separate element comprising simply a washer disposed beneath the end of the stud with a hole therethrough for receiving the rivet 42. Alternatively, the flange 52 may be an integral part of the stud. The upper end of the stud is desirably chamfered or bevelled as at 54 to facilitate reception of the eyelet thereover. Such end of the stud may be countersunk as at 56 to receive the end 58 of the rivet. The opposite end of the rivet may be ballooned as at 60. Either end of the rivet as desired may be upset in securing the stud and strap to the bag, i.e., either end 58 or end 60.

That portion of the strap which encircles the frame 30 may be referred to as the bight portion S-2 of the strap, while the remainder may be considered the free end portion S-3 which terminates in the end tab S-4. The free end has secured thereto the eyelet 62 which may be of conventional construction and in general appears as an annulus having a radially outwardly opening channel 64 within which it grips the marginal edge of the hole or aperture 66 through the strap portion S-3 into which the eyelet is set.

Figure 15:
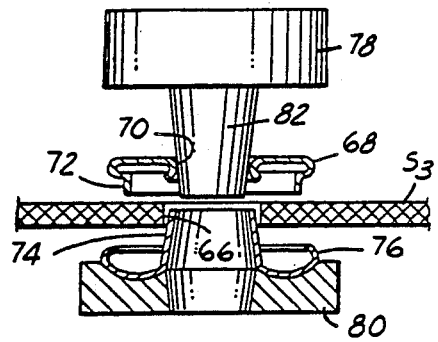
FIGS. 15 and 16 illustrate the assemblying of an eyelet useful in my invention.
Figure 16:
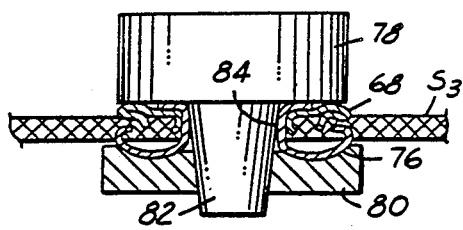

In commercial practice eyelets are often formed of two cooperating annuli best shown in FIGS. 15 and 16. A female annulus 68 has a central aperture 70 and an outer flange 72. A male annulus has a central portion 74 receivable through the aperture 66 in the strap portion S-3 and into the central opening 70. The male annulus also has a peripheral flange 76 for embedding in the material of strap portion S-3. With the parts arranged as shown in FIG. 15 between a pair of cooperating die members 78 and 80, the dies are brought together to force the male and female annuli into mating and conformed relation as shown in FIG. 16. The nib portion 82 of die 78 serves to not only assist in forming the annuli into the locked relation shown in FIG. 16, but also, and importantly, serves to internally size the aperture 84 in the eyelet so that it is the proper diameter to cooperate with the stud.

In use, the strap S is looped around the frame portion 30 and the free end S-3 is brought into conjunction with the stud with the aperture 84 in the eyelet aligned with the stud head and then the strap is pressed down over the stud to telescope the eyelet 62 down over the stud until it is below the shoulder 50, at which point the eyelet will assume a skewed position on the stud as shown in FIG. 2. In such skewed position the strap is latched on the stud and cannot be withdrawn therefrom by pulling at portion S-3 outwardly along the stud or by pulling downwardly on the bag 36 away from frame 30.

It will be noted from FIG. 2 that the frame 30 imparts an angle of incidence, or angle of departure $\theta$, to the strap portion S-3 which naturally maintains the eyelet in the aforesaid skewed relation on the stud in which the eyelet is caught at one side beneath the shoulder 50 and at the opposite side rides the eyelet bearing surface of the stud head spaced axially outwardly from the shoulder 50. This angle $\theta$ of the strap which will be naturally assumed by the arrangement shown in FIG. 2 will effectively serve to maintain the fastener in a latched condition. Even without the presence of the frame 30, if there is sufficient resiliency in the strap, it may alone serve to hold the fastener parts in substantially the position shown in FIG. 2 whereby the fastener will remain in a temporarily latched condition. To unlatch the fastener, it is merely necessary to bring the eyelet into sufficient alignment with the axis of the stud so that the side of the eyelet trapped beneath the shoulder may be raised away from the bag 36, i.e., moved to the left as viewed in FIG. 2. This may be accomplished either by depressing portion S-3 of the strap toward portion S-1 and simultaneously drawing the eyelet off the stud, or such may often be accomplished by simply grasping the tab S-4 of the strap and tugging it outwardly on the stud, i.e., toward the left as viewed in FIG. 2. This will normally serve to pivot the eyelet sufficiently on the stud to align the eyelet with the stud so that the same may be withdrawn therefrom.

It will be noted that the load indicated as arrow L in FIG. 2 will tend to cause the stud to rotate in a clockwise direction R, and this will serve to further enhance the latched condition of the stud and eyelet. Further, the outward loading 1 on the eyelet must necessarily be at that side which rides the eyelet bearing surface of the head 46 and which is generally opposite to the load L.

Figure 8:
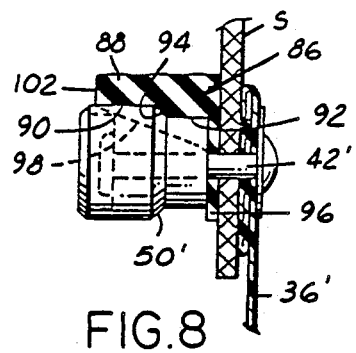
FIG. 8 is a cross-sectional view of another modification of my invention having eyelet biasing means associated therewith.
Figure 9:
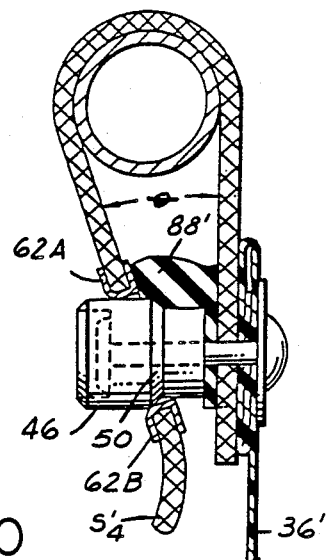
FIG. 9 shows the relative position of the stud and eyelet when latched together using the embodiment of FIG. 8.
Figure 10:
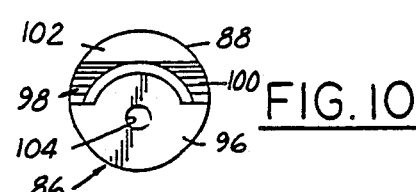
FIG. 10 is an end view of the elastomer element only (without the stud) of the FIG. 8 embodiment.

While I have shown the stud and eyelet fastener in association with a strap looped over a frame and suspending a linen bag, it will be understood that there are many applications where my stud and eyelet may be used wherein the parts being connected are so arranged that the stud and eyelet mounted thereon or associated therewith, will be naturally positioned or held in the above described skewed and latched relation. However, there may be applications where it is desirable to assure a more positive approach to maintaining the latched relationship of the stud and eyelet. In FIGS. 8, 9 and 10 I have shown a modification of the invention wherein means are provided for yieldingly urging the eyelet to its latched position on the stud. In this embodiment an elastomeric button or abutment 86 is disposed between one side of the eyelet and the part on which the stud is mounted, i.e., the strap portion S-1 or bag margin 40. The button may be formed of any suitable elastomeric material such as a urethane rubber. The button includes an upstanding cushion or pillow portion 88 having a pair of cylindric surfaces 90 and 92 connected by a bevelled shoulder 94, all of which closely overlie corresponding opposed surfaces of the stud. The button further includes a base portion 96 trapped between the lower end of the stud shank and the strap S. In the embodiment shown in FIGS. 8, 9 and 10, the stud does not have a flange 52 such as shown in the FIG. 2 embodiment. It will be noted from FIGS. 8 and 10 that the pillow or cushion portion 88 only overlies one side of the stud and is provided with tapering edges 98 and 100, whereby the resistance to deflection increases from the outer end 102 toward the base. There is a hole 104 in the base 96 to receive therethrough the rivet 42. It will be noted that the outer end 102 of the button is adjacent the cylindrical eyelet bearing surface of the head 46.

Other than as above described, the embodiment of FIGS. 8, 9 and 10 corresponds to that of FIG. 2 and in use the eyelet is first positioned in substantial coaxial alignment with the stud and then pressed downwardly thereover and against the elastomeric button to deflect the same so that the side of the eyelet opposite the button may be caught beneath the shoulder 50 while the side of the eyelet engaging the button is urged outwardly to ride the eyelet bearing surface of the head 46 outwardly of the shoulder as best shown in FIG. 9. It will be noted that the pillow or cushion portion 88 assumes a bulge as shown at 88' in FIG. 9 to maintain the eyelet tensioned outwardly at the side opposite that caught beneath the shoulder. The elastomeric button thus serves to releasably hold the eyelet and stud in latched relation and prevents accidental or unintentional disconnection through vibration, shaking or similar motions to which the fastener may be subjected. To release the stud and eyelet from the latched condition of FIG. 9, it is only necessary to depress side 62A of the eyelet against the elastomeric cushion, thereby bringing the eyelet and stud more nearly into coaxial alignment and then the eyelet may be withdrawn from the stud. Alternatively, grasping end S-4 of the strap and pulling it away from the bag 36 will often suffice to deflect the eyelet into sufficient coaxial alignment with the stud that it may be withdrawn therefrom.

In connecting the eyelet to the stud in the embodiment of FIGS. 8, 9 and 10, as the eyelet is pressed down over the stud against the resistance of the elastomeric button, when the side 62B reaches a point where it is beneath the shoulder and the eyelet can assume the skewed position of FIG. 9, there is an audible snapping action signaling to the user that the stud and eyelet have assumed the latched condition. This sound arises from the eyelet suddenly shifting laterally against the shank of the stud under the resilient force of the cushion or pillow.

Figure 11:
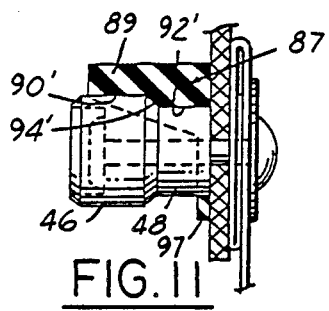
FIG. 11 is a modification of the invention somewhat similar to FIG. 8.
Figure 12:
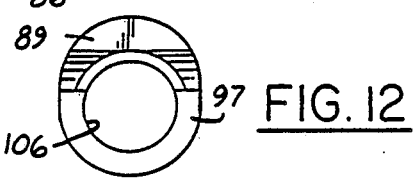
FIG. 12 is an end view of the elastomer element only (without the stud) of the modification of FIG. 11.

FIGS. 11 and 12 show a further embodiment of the means for urging the eyelet into skewed position. Such means is similar to that described in FIGS. 8, 9 and 10 except instead of having a base portion 96 trapped beneath the lower end of the stud shank, the button 87 has a closed loop base portion 97 which is stretched around the shank 48 of the stud to be retained thereon and in the desired angular relationship therewith by the internal friction between the aperture 106 (see FIG. 12) in the button and the cylindric surface of the stud shank 48. Internally button 87 corresponds to button 86 in having cylindric surfaces 90', 92' and 94' which overlie corresponding opposed surfaces of the stud. The pillow or cushion portion 89 tapers from the outer end to the base 97 similar to that of the FIG. 8 embodiment. The closed loop base 97 of this button is intended to be stretched over the head 46 of the stud to place the button on the stud and therefore this button may be mounted on the stud of the FIG. 2 embodiment should the user deem such desirable.

The construction of the FIG. 11 and 12 embodiment permits angular adjustment of the button 87 on the stud to accommodate the angle of departure of whatever member the eyelet is attached to. As shown in FIG. 11, the button is positioned so that the angle of departure or skewed arrangement of the eyelet would be similar to that shown in FIGS. 2 and 9. It will be apparent that by rotating the button 87 to a different angular position, the skewed relation of the eyelet on the stud may be altered as desired.

Figure 13:
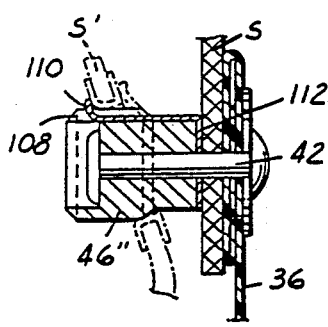
FIG. 13 is a further modification showing means for biasing the eyelet to its latched position on the stud.
Figure 14:
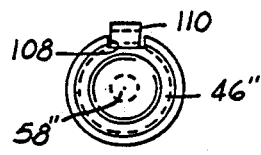
FIG. 14 is an end view of the stud shown in FIG. 13.

A further embodiment of the means for yieldingly biasing the eyelet to its latched condition on the stud is shown in FIGS. 13 and 14. In this embodiment the stud is generally similar to that shown in FIG. 11, except the head portion 46" is slotted as at 108 to receive therewithin the upper end of a resilient finger 110. The finger is provided with a base portion 112 which is trapped beneath the lower end of the stud shank and the strap S, the parts being held together by a rivet 42 as previously described in connection with the other embodiments. The base 112 is provided with an aperture through which the rivet extends. The base may be generally circular in configuration, conforming to the diameter of the stud shank. The finger 110 extends at right angles from this base upwardly along the side of the button shank with the upper end of the finger received within the groove 108 for deflection from the solid outline to the phantom outline positions shown in FIG. 13 when the eyelet is telescoped down over the stud.

In use, the embodiment of FIG. 13 requires placement of the stud in the proper angularly related position on the strap S, bag 36, or whatever other part it is mounted to, so that the skewed position of the eyelet when in latched condition will provide an angle of departure for the member to which the eyelet is mounted that conforms with the requirements of the installation. As shown in FIG. 13, the eyelet is in phantom outline position showing an angle of departure for the member S' similar to that of FIGS. 2 and 9. The finger 110 and base 112 may be made of any suitable resilient material, either metal or plastic. The finger is intended to urge the eyelet into the latched condition similar to that of the elastomeric button.

Figure 17:
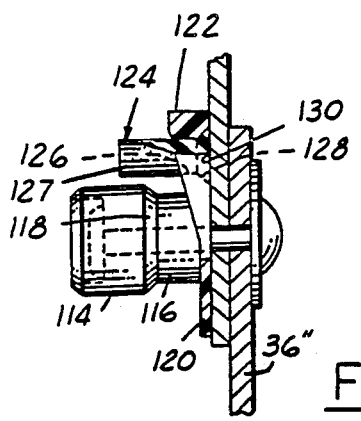
FIG. 17 is a further embodiment of the invention in which the eyelet biasing means is supported in the stud base.

In FIG. 17 I have shown a further embodiment of the means for urging the eyelet to a latched condition on the stud. In this embodiment, the stud may be formed with a head portion 114, an integral shank portion 116 of smaller diameter than the head with such portions connected by the tapered shoulder 118. The stud may be further provided with an integral base 120, or laterally extending member, one side of which is of increased thickness as at 122 to provide a support port for an elastomeric button 124. For this purpose the base portion 122 is provided with a through aperture 126 disposed adjacent the shank 116 but spaced radially therefrom with the axis of the aperture extending generally parallel to the axis of the stud, shank and head. The lower end of the aperture 126 may be chambered as at 128. The button 124 may be similarly provided with an enlarged flat head 130 complementing the chamber 128 of the aperture whereby the button may be inserted through the aperture 126 to be received snugly therein and having a projecting pillow portion 127 disposed closely adjacent the stud and projecting upwardly therealong.

The eyelet is placed over the stud as in the previously described embodiments and will bear against the elastomeric button 124 which will deflect beneath the eyelet as the eyelet is forced down onto the stud and the button will cause the eyelet to audibly snap into place when it latches on the stud. While FIG. 17 shows the stud and base 120 as formed of plastic, and such may be the preferable construction, it should be understood that the part may be formed of metal, as desired. The elastomeric button is inserted into the base portion 122 prior to assembling the stud on whatever support 36" it is to be attached to.

In FIG. 7 I have shown a stud 132 similar to that of the embodiment of FIGS. 3, 4 and 5, secured to a rigid support such as a wooden member S" of a boat or other structure. It is held thereto by a screw member 134. While the stud is shown as having a base flange 136, it is to be understood that such may be omitted as desired and that eyelet biasing means such as the elastomeric buttons 86 or 87 may be employed. In addition, and with reference to FIG. 7, it is to be understood that the embodiment of FIG. 17 could be secured to a support such as the support S" of FIG. 7 by the screw member 134, rather than the rivet shown in FIG. 17. The eyelet to be mounted on stud 132 may be on a boat cover or other canvas or fabric member to be connected to support S".

In FIG. 6 I have shown a further modification of the stud. In this embodiment the head 138 is itself askew the axis of the stud shank 140. The eyelet 142 may be normally disposed on the stud as in the position shown, where the angle of departure of the member 144 may substantially parallel the member 146 and/or 148 upon which the stud is mounted. It will be noted that with the stud oriented as shown in FIG. 6, the eyelet may only be withdrawn therefrom by shifting the side 142' of the eyelet toward the left as viewed in FIG. 6, so that the eyelet assumes a position of substantial coaxial alignment with the head 138. If the angle of departure of the member 144 is as shown in FIG. 6 and there is some tension thereon resisting the movement of the eyelet as aforesaid, the parts will tend to maintain the eyelet on the stud as shown. It will be appreciated that this embodiment is different from those previously described, in that the eyelet is not retained in a latched condition with one side caught beneath the shoulder 150 and the opposite side riding on the stud head, though in certain environments such a relationship might obtain.

In FIG. 5 I have shown dimensional relationships which may be involved in one typical embodiment of the eyelet and stud to illustrate possible relative dimensions of the parts. As shown, dimension B which is the nominal diameter of the eyelet bearing surface of the stud head outwardly of the latching shoulder 50 may be about 0.437 inches. The internal diameter of the eyelet, or, in other words, the diameter A of the aperture 84, is about 0.003 inches to 0.005 inches greater than dimension B. Dimension C, which is the effective internal axial length of the aperture 84, may be about 0.100 inches. Dimension D, which is the effective axial length of the diameter B of the stud head, is about 0.235 inches. A typical over-all height E of the stud, measured from the top of the base flange, may be about 0.375 inches. The diameter F of the shank may be about 0.350 inches. Desirably, the eyelet and stud have a slip fit which means that there would be a tolerance between them on the order of from 0.003 inches to 0.005 inches. Utilizing the latching principles herein disclosed, stud and eyelets of various other sizes may be provided as desired. From the foregoing typical dimensions it will be noted that the axial dimension D of the stud outwardly of the shoulder 50 is about three times the axial dimension C of the eyelet aperture. I have found that in practice this is a satisfactory relationship but D may be also, at one extreme about twice C. There is no practical upper limit on the length of D except that as such dimension is increased it increases the over-all height of the stud and in many instances it is desirable to keep the over-all height low. Dimension G, not given, may be varied as desired, as long as it is great enough to permit the eyelet to underlie the latching shoulder and lock in place as shown in FIG. 2.

While I have shown the elastomeric buttons 86, 87 and 124 connected to the stud, it should be understood that an elastomeric button may be affixed to the eyelet itself at one side of its aperture to bear against the member on which the stud is mounted. Other modifications may occur to those skilled in the art as this improved type of snap fastener is used.

The term "eyelet" as used herein is intended to cover either a one-piece member as shown in FIG. 2 or a two-piece member as shown in FIGS. 15 and 16 which is occasionally referred to in the trade as a "grommet".

Figure 18:
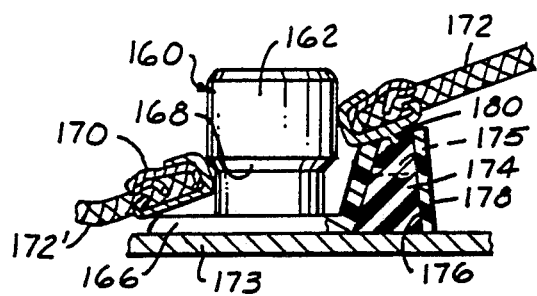
FIG. 18 is a side elevation, partially in section, showing a further embodiment of my invention.
Figure 19:
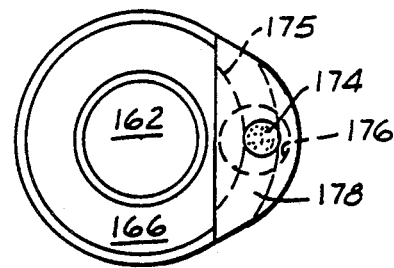
FIG. 19 is a plan view of the stud portion only of the embodiment of FIG. 18.

In FIGS. 18 and 19 I have shown a further embodiment wherein the stud 160 is a molded plastic part, such as nylon, and includes an integral head 162, shank 164 and base 166 with a latching shoulder 168 beneath which is caught one side of the eyelet 170 mounted on one of the parts 172 (such as a fabric material) to be connected. The stud 160 may be secured in upstanding relation on the other part to be connected 173. A marginal edge or tab-like portion 172' facilitates unlatching of the stud and eyelet as in the previously described embodiments. In this embodiment the stud and eyelet are held in latched or locked condition by an elastomeric pillow or pad 174 trapped in a pocket 176 formed in an enlargement 178 of the base at one side of the stud head. The pillow may be in the shape of a truncated cone and the pocket similarly shaped to receive it. The upper end of the pillow is exposed as shown and a small projection 180 formed on the eyelet bears against the pillow through the open top of the pocket. The pillow 174 may be molded in the pocket, or pressed therein as desired.

To assemble the eyelet on the stud, the eyelet is coaxially aligned with the head 162 and the projection 180 brought into engagement with the pillow. The side of the eyelet opposite the pillow is then depressed to the position shown in FIG. 18 and a positive snapping sound signals to the user that the parts are latched together.

The projection 180 may either be a pimple-like protuberance or it may comprise an annular ridge extending around the underside of the eyelet. In the former case the eyelet must be rotationally oriented before snapping the parts together so that the projection can engage the pillow. In the latter arrangement the annular projection will engage the pillow whatever the rotated position of the eyelet. In this instance the upper end of the enlargement will have an arcuate groove shown in phantom outline at 175 to accommodate the annular projection and allow it to engage the pillow. The pillow will be held in the pocket by part 173 or may otherwise be secured therein in any suitable fashion.

Figure 20:
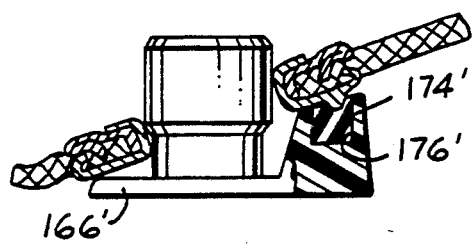
FIG. 20 is a side elevation, partially in section, showing another embodiment of my invention.

FIG. 20 is similar to FIGS. 18 and 19 except the pocket 176' does not open through the bottom of the base 166' and the pillow 174' is smaller to accommodate the reduced size pocket. In this embodiment the pillow may be adhesively secured within the pocket or may be pressed therein, or it may be molded in the pocket.

Figure 23:
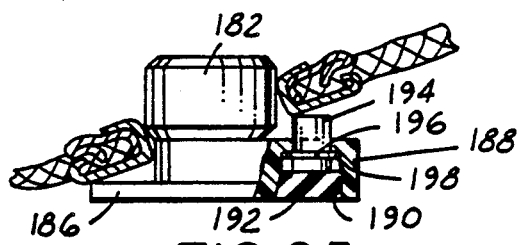
FIG. 23 is a side elevation, partially in section, of another embodiment of my invention.
Figure 24:
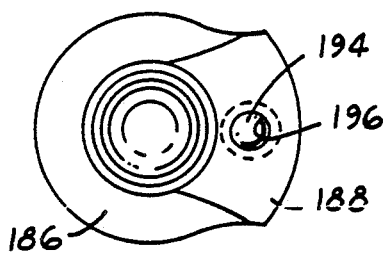
FIG. 24 is a plan view of the stud portion only of the embodiment of FIG. 23.

In FIG. 23 a somewhat lower profile stud is shown and the elastomer receiving pocket is not separated from the stud shank. In this embodiment the stud head 182 sits atop a shank portion 184 both of which are integrally molded with a base flange 186. The shank includes a laterally extending portion 188 having an elastomeric pillow receiving pocket 190, within which is a urethane pillow 192 beneath a captive button 194. The button may be formed of any suitable material and is shown as cylindrical and projecting upwardly out of the pocket through a pocket opening 196, being held in the pocket against the compressive force of the pillow by a shoulder or flange 198. The button bears against the eyelet urging it into the latched condition on the stud.

By virtue of the elastomeric nature of the pillow, the button may be depressed slightly as the eyelet is moved to the position shown in FIG. 23 and as in certain of the other embodiments an audible snapping action signals to the user that the eyelet is latched on the stud. This embodiment does not require an eyelet with a projection as in FIGS. 18 and 21, nor rotational orientation of the eyelet and stud. The stud may be a plastic molded part. The pillow may be held in the pocket either by the part on which the stud is mounted (not shown) or may be adhesively secured in the pocket, or both. The button 194 may be a plastic part such as nylon, Delrin, brass, or any material suitable for the environment in which the fastener will be used. The stud may be mounted on whatever part is desired by a screw attachment as in FIG. 7, or by riveting, bolting, or adhesive securement or the like. The eyelet is of conventional construction, readily purchasable on the market. As before explained, in assembling the eyelet it should desirably be sized as in FIGS. 15 and 16.

Figure 25:
FIG. 25 is a side elevation of a modified form of the button of FIG. 23.

The resistance to depression or stiffness of the button, and as a result the ease with which the eyelet and stud may be latched or unlatched, can be varied without modification of the pillow simply by modification in the design of the button. In FIG. 25 the button 194' is provided with a conical lower end 200 rather than the cylindrical end as in FIG. 23. Such conical end can more easily be pressed into the urethane or other elastomeric pillow and thus by using the button of FIG. 25 in the FIG. 23 stud construction, the fastener may be caused to have a somewhat softer action.

Figure 21:
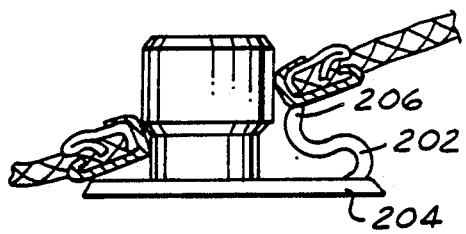
FIG. 21 is a side elevation of another embodiment of my invention.
Figure 22:
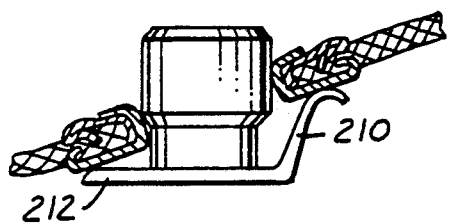
FIG. 22 is a side elevation of another embodiment of my invention.

In FIGS. 21 and 22 I have shown two further modifications wherein the means for releasably holding the stud and eyelet in the skewed or latched condition comprises a leaf spring-like arrangement or resilient spring finger. In FIG. 21 the stud is similar to that of FIG. 18 but an S-shaped leaf spring 202 is secured to the base 204 as by being integrally molded as one piece of plastic therewith, or the spring may be formed of spring steel or the like and secured to the base 204 in any suitable fashion. The tip 206 of the spring will bear against the eyelet and as the eyelet is pushed down over the stud to its latched position, the spring will deflect, urging the eyelet to the skewed latched position shown.

In FIG. 22 the spring 210 is shown as an integral part of the base 212 of the stud. Its function is similar to that of FIG. 21.

In the embodiments of FIGS. 18, 20, 21 and 22 the base 166, 166', 204 and 212 was referred to as being integrally formed with the stud head and shank. While this may be preferable in many instances, the base and associated means for holding the eyelet in the latched condition may be separately formed and/or assembled with the head and shank of the stud.

I claim:

1. A fastener, comprising, in combination:
   a stud intended to project in upstanding relation from a part to be fastened and having a latching shoulder spaced from but facing such part and also having an eyelet bearing surface on the opposite side of said shoulder from the part;
   an eyelet intended to be associated with another part to be fastened and having an inelastic aperture dimensioned to telescope over the stud and beneath the shoulder when the axis of the stud is substantially perpendicular to the pane of the eyelet;
   the diameter of the aperture of said eyelet being less than the diagonal dimension of the stud measured from beneath said shoulder to a point on said eyelet bearing surface, whereby skewing the stud and eyelet relative to each other while one side of the eyelet is caught beneath the shoulder will cause the opposite side of the eyelet to ride said bearing surface, latching the stud and eyelet together.

2. The invention defined in claim 1 further comprising means for holding said stud and eyelet in said skewed position.

3. The invention defined in claim 2 wherein said means for holding comprises yieldable biasing means disposed between the eyelet and stud.

4. The invention defined in claim 3 wherein said biasing means comprises an elastomer.

5. The invention defined in claim 3 wherein said biasing means comprises a resilient spring finger.

6. The invention defined by claim 2 wherein said means for holding comprises yieldable biasing means disposed between the opposite side of the eyelet from that caught beneath the shoulder and the part from which the stud projects.

7. The invention defined by claim 6 wherein said biasing means comprises an elastomeric member disposed adjacent the stud to engage the eyelet at the opposite side from that caught beneath the shoulder and yieldingly bias such side of the eyelet outwardly along the stud to thereby retain in latched relation the side of the eyelet caught beneath the shoulder.

8. The invention defined by claims 1, 2, 3, 4, 5, 6 or 7, therein said stud has an enlarged head portion and a reduced diameter shank portion and said shoulder encircles the stud and extends between the head and shank portions.

9. The invention defined by claim 1 wherein there is eyelet biasing means for engaging the eyelet at said opposite side to hold the same against the stud above the shoulder, and said eyelet biasing means comprises an elastomeric button disposed between the eyelet and the first mentioned part to be fastened.

10. The invention defined by claim 1 wherein the axial dimension of the stud outward of the latching shoulder is at least twice the axial dimension of the eyelet aperture.

11. A fastener comprising, in combination:
a stud intended to project in upstanding relation from a part to be fastened and having a head portion and a reduced diameter shank portion spacing the head portion from said part to be fastened;
a circumferential shoulder on said stud between the head and shank portions, said shoulder having an eyelet latching surface surrounding the shank;
said head portion having a generally cylindrical eyelet bearing surface extending axially along the stud from said shoulder;
an elastomeric button extending along one side of the stud between said part to be fastened and the head and having an end disposed adjacent the eyelet bearing surface of the head;
an eyelet intended to be associated with another part to be fastened and having an inelastic aperture dimensioned to telescope over the stud head and shoulder; and
one side of the eyelet adapted to engage the end of the button as it telescopes over the head and deform the button sufficiently to allow the opposite side of the eyelet to pass beneath and latch against said shoulder while the side of the eyelet engaging the button rides on the eyelet bearing surface of the head, latching the eyelet on the stud.

12. The invention defined by claim 11 wherein the elastomeric button has a closed loop end stretched around the shank of the stud holding the button associated with the stud.

13. The invention defined by claim 11 wherein the elastomeric button has a base portion extending between the shank and said part to be fastened and gripped therebetween to be held associated with the stud.

14. The invention defined by claim 11 wherein said stud has a base integral with the shank spaced from the head portion, said base having a laterally disposed portion supporting the elastomeric button in upstanding relation adjacent the stud.

15. The invention defined by claim 11 wherein means are provided for supporting the elastomeric button comprising a laterally extending member at the end of the stud shank spaced from the head portion and supporting the button adjacent the stud head.

16. A fastener comprising, in combination:
a stud having at one end a base portion for mounting in overlying relation on a first part to be fastened and having a latching shoulder spaced from but facing the base portion;
an eyelet intended to be associated with another part to be fastened and adapted to be telescopically slipped over the stud to a skewed position wherein one side of the eyelet is caught beneath said shoulder and the other side of the eyelet rides the stud above the shoulder; and
eyelet biasing means disposed between said other side of the eyelet and said base portion of the stud to hold the eyelet in such skewed relation on the stud.

17. The invention defined by claim 1 wherein said stud is provided with a laterally offset resilient portion for engaging the eyelet on that side of the stud opposite the side caught beneath the shoulder for urging the eyelet to said skewed position.

18. The invention defined by claim 17 wherein said laterally offset portion includes an elastomeric element for engaging the eyelet and urging it toward said skewed position.

19. The invention defined by claim 17 wherein said laterally offset portion comprises an elastomeric pillow and means for holding the pillow in a position for engaging the eyelet and yieldingly biasing the eyelet to said skewed and latched position.

20. The invention defined by claim 19 wherein the means for holding the pillow comprises a pocket and the pillow is disposed in the pocket with a portion of the pillow exposed through an open end of the pocket to co-act with the eyelet.

21. The invention defined by claim 19 wherein the eyelet includes a projection for engaging the elastomeric pillow.

22. The invention defined by claim 19 wherein said elastomeric pillow includes an eyelet engaging button disposed between the elastomeric pillow and the eyelet.

23. A fastener, comprising, in combination:
a stud intended to project in upstanding relation from a part to be fastened and having a latching shoulder spaced from but facing such part;
an eyelet intended to be associated with another part to be fastened and having an inelastic aperture dimensioned to telescope over the stud and beneath the shoulder;
said stud and eyelet while in the aforesaid telescoped relation being relatively shiftable to a skewed position wherein one side of the eyelet is caught beneath the shoulder and the opposite side rides the stud above the shoulder, latching the stud and eyelet together;
means associated with the stud defining a pocket; and
an elastomeric pillow disposed in said pocket and having a portion for engaging the eyelet at said opposite side thereof for releasably holding the stud and eyelet in said latched relation.

24. The invention defined by claim 23 wherein an eyelet engaging button is disposed between the eyelet and the elastomeric pillow, and means for captively retaining the button in said pocket.

* * * * *